United States Patent
McDaniel et al.

(10) Patent No.: US 12,443,880 B2
(45) Date of Patent: Oct. 14, 2025

(54) INCREMENTAL TRAINING OF A MACHINE-LEARNING MODEL (MLM) FOR MULTIVIEW ITEM RECOGNITION

(71) Applicant: NCR Voyix Corporation, Atlanta, GA (US)

(72) Inventors: Christian Lee McDaniel, Atlanta, GA (US); Stefan Bjelcevic, Roswell, GA (US); Justin Paul, Atlanta, GA (US); Georgiy Pyantkovs'ky, Atlanta, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 645 days.

(21) Appl. No.: 17/733,139

(22) Filed: Apr. 29, 2022

(65) Prior Publication Data

US 2023/0252343 A1    Aug. 10, 2023

Related U.S. Application Data

(63) Continuation-in-part of application No. 17/665,145, filed on Feb. 4, 2022.

(51) Int. Cl.
*G06N 20/00* (2019.01)
*G06K 7/14* (2006.01)

(52) U.S. Cl.
CPC ........... *G06N 20/00* (2019.01); *G06K 7/1413* (2013.01)

(58) Field of Classification Search
CPC .............................. G06N 20/00; G06K 7/1413
See application file for complete search history.

(56) References Cited

U.S. PATENT DOCUMENTS

| | | | |
|---|---|---|---|
| 11,481,751 B1* | 10/2022 | Chauvard | G06V 10/82 |
| 2013/0304595 A1* | 11/2013 | Goncalves | G06T 7/001 |
| | | | 705/22 |
| 2019/0108396 A1 | 4/2019 | Dal Mutto et al. | |
| 2021/0334590 A1* | 10/2021 | Rodriguez | G06F 18/214 |

OTHER PUBLICATIONS

EP Examination Report dated Feb. 14, 2025.

\* cited by examiner

*Primary Examiner* — Vu Le
*Assistant Examiner* — Tracy Mangialaschi
(74) *Attorney, Agent, or Firm* — Schwegman Lundberg & Woessner, P.A.

(57) ABSTRACT

Multiple images of multiple items are captured of a transaction area during a checkout. The Red-Green-Blue (RGB) data associated with each item image patch is collected across the images and provided as input by a Machine-Learning Model (MLM), which returns an item code for the item. When the given MLM is unable to satisfactorily predict an item code for a given set of image patches, the patches associated with the images are presented to an operator of a checkout and the operator is asked to scan an item barcode for that item. The patches are labeled within the images with the item code and additional images of the item are captured and labeled with the item code when the barcode is scanned by the operator. The labeled images are used in a subsequent training session with the MLM to improve its item recognition accuracy for the item.

20 Claims, 3 Drawing Sheets

INCREMENTAL TRAINING OF A MACHINE-LEARNING MODEL (MLM) FOR MULTIVIEW ITEM RECOGNITION

RELATED APPLICATIONS

The present application is Continuation-In-Part (CIP) of application Ser. No. 17/665,145 entitled "Multi-Item Product Recognition for Checkouts" filed on Feb. 4, 2022, the disclosure of which is incorporated in its entirety herein and below.

BACKGROUND

To train a Machine-Learning Model (MLM) to make predictive output on input data provided requires a lot of work. The expected output that the MLM is supposed to produce is labeled within the training data, such that the other input data provided during training can be used to derive algorithms and weighting factors for the MLM to produce the corresponding labeled data (expected output). Thus, MLMs require a lot of labeled data for training. This can be a very tedious and time-consuming manual task.

Once the MLM is properly trained with good, labeled data, the MLM can be processed using multiple images (multiple views) of a predefined area where transaction items are placed. The MLM returns the item codes associated with each unique item placed in the predefined area when provided the images as input. However, the MLM may be unable to properly classify and identify some portions of the images for a variety of reasons, such as a previous item's appearance changed (possible due to seasonal promotions for the items), a new item is presented that the MLM was never trained on, and/or the item associated with the portions of the images is sufficiently blocked (occluded) such that good image data cannot be acquired for the MLM classification of that item In addition, item classification MLMs cannot be expected to be 100% accurate even under the best training and operating conditions. There can be unexpected issues associated with the training conditions and/or with the operating conditions.

In such situations, their needs to be techniques that improve on the accuracy of the MLM going forward and that create the least amount of friction as is needed for a customer during a checkout.

SUMMARY

In various embodiments, a system and methods for incremental training of a Machine-Learning Model (MLM) for multiview item recognition are presented.

According to an embodiment, a method for an incremental training of a MLM for multiview item recognition is provided. Images of a transaction area depicting items are obtained. A determination is made that a set of image patches within the images is associated with an unknown item. The set of image patches are provided to an operator associated with a checkout. An item code scanned from the unknown item by the operator is received. The image patches for the images are labeled with the item code for a known item and labeled image patches associated with the item code are saved with the images for a subsequent training session with an item classification MLM.

DETAILED DESCRIPTION

Figure 1:
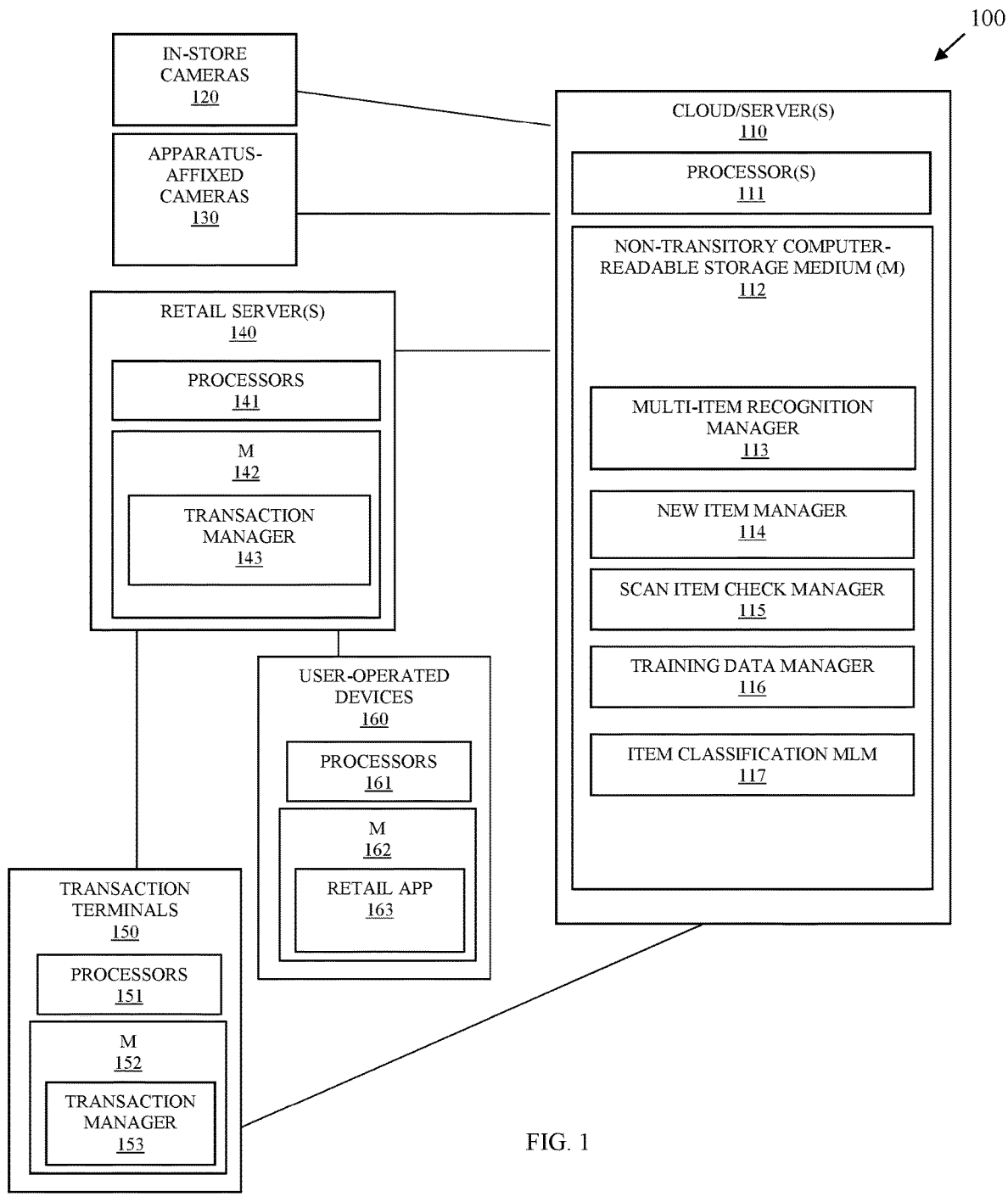
FIG. 1 is a diagram of a system for an incremental training of a MLM for multiview item recognition, according to an example embodiment.

FIG. 1 is a diagram of a system 100 for an incremental training of a MLM for multiview item recognition, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of incremental training of a MLM for multiview item recognition, presented herein and below.

As used herein a "scene" refers to a defined area/scan zone/transaction area where a set or multi-items of a customer are being monitored through multiple images taken at multiple different angles. The multi-items can be stationary or can be moving with the customer in a basket, a cart, in their hands and arms, or in a bag. The scan zone/transaction area can be any predefined shape, predefined size, and predefined dimensions.

System 100 illustrates techniques by which an item classification MLM can be incrementally trained when item patches from the multiple images are unable to produce an item code for the corresponding item with a sufficient (threshold-based) confidence level by the MLM. The boundaries of the item patches are visually identified in the images and passed back to an operator during a checkout and the operator is asked to identify the unknown item from their items and uses a scanner to can an item barcode off the item. During the scan multiple additional images are taken of the unknown item. When the item code is known after reading the item barcode, the original images captured, and the corresponding patches are labeled with the item code and the additional images are labeled with the item code. The labeled original images with patches and the labeled additional images are then set aside for a subsequent training session with the MLM to improve the accuracy of the MLM with respect to the original unknown item.

Additionally, if the operator attempts to swap the unknown item with a different item during the scan, the additional images captured during the barcode scanning can be evaluated against the patches to determine if there is a threshold level of similarity. If there is not, an alert can be raised to suspend the checkout for an attendant to review the item scanned. Still further, when a new item code is identified that was never associated with training the MLM, a flag can be raised to add the corresponding item and additional images of the new corresponding item during subsequent training with the MLM.

The operator can be an attendant that is performing a cashier-assisted checkout at a Point-Of-Sale (POS) transaction terminal or can be a customer that is performing a self-checkout at a Self-Service Terminal (SST) (another type of transaction terminal). In this way, when new items are detected, the casher can add the new items by scanning the item bar code for each new item and multiple images are captured of the new items during the barcode scanning. The images are labeled with the corresponding item code and used during training for the MLM.

In this way the MLM is incrementally trained using a "snow ball" or operator "crowd source" technique to gather as many images of items as possible from real-world checkouts that are then used to train the MLM.

Various embodiments are now discussed in greater detail with reference to FIG. 1.

System 100 comprises a cloud/server 110, in-store cameras 120, apparatus-affixed cameras 130, one or more retail server 140, transaction terminals 150, and user-operated devices 160.

Cloud/Server 110 comprises a processor 111 and a non-transitory computer-readable storage medium 112. Medium 112 comprises executable instructions for a multi-item recognition manager 113, a new item manager 114, a scan item check manager 115, a training data manager 116, and an item classification MLM 117. The executable instructions when provided or obtained by the processor 111 from medium 112 cause the processor 111 to perform operations discussed herein with respect to 113-117.

In-store cameras 120 may be stationary cameras placed throughout a store, such as overhead cameras situated overhead of transaction areas of terminals 150 and/or situated along side countertops associated with terminals 150.

Apparatus-affixed cameras 130 may be affixed to the sides of baskets and carts. One camera 130 for a cart or a basket may be placed along a top edge of the cart or basket and pointed down into the basket or cart. Other cameras 130 for the cart or basket may be affixed to 2 or more sides of the cart or basket focused into the cart or basket.

In an embodiment, only apparatus-affixed cameras 130 are used for the embodiments discussed below.

In an embodiment, only in-store cameras 120 are used for the embodiments discussed below.

In an embodiment, a combination of in-store cameras 120 and apparatus-affixed cameras 130 are used for the embodiments discussed below.

In an embodiment, 3 cameras 120 and/or 130 are used for the embodiments discussed below.

In an embodiment, 4 cameras 120 and/or 130 are used for the embodiments discussed below.

In an embodiment, 5 or more cameras 120 and/or 130 are used for the embodiments discussed below.

In an embodiment, one or all of the cameras 120 and/or 130 are depth cameras.

Each retail server 140 comprises at least one processor 141 and a non-transitory computer-readable storage medium 142. Medium 142 comprises executable instructions for a transaction manager 143. The executable instructions when provided or obtained by the processor 141 from medium 142 cause the processor 141 to perform operations discussed herein with respect to 143.

Each transaction terminal 150 comprises at least one processor 151 and a non-transitory computer-readable storage medium 152. Medium 152 comprises executable instructions for a transaction manager 153. The executable instructions when provided or obtained by the processor 151 from medium 152 cause the processor 151 to perform operations discussed herein with respect to 153.

Each user-operated device 160 comprises at least one processor 161 and a non-transitory computer-readable medium 162. Medium 162 comprises executable instructions for a retail application (app) 163. The executable instructions when provided or obtained by the processor 161 from medium 162 cause the processor 161 to perform operations discussed herein with respect to 163.

Multi-item recognition manager 113 is configured to isolated item image Red-Green-Blue (RGB) image data in each of several images captured by cameras 120 and/or 130 during a checkout. Each RGB image captures is of a transaction area/scan zone. Manager 113 uses depth information associated with depth images, which are also provided by the cameras 120 and/or 130, to determine the physical locations of each unique RGB image data patch (just image patch) within the RGB images. The image patches are clustered together as a single potential item represented in the images and each set of image patches is passed as input to a trained item classification MLM 117. MLM 117 returns an item code for each image patch and when the item codes do not agree for all of the images patches of a given set manager 113 processes rules to determine the item code to select for the given set of patches. The item codes are then provided to transaction manager 143 and/or 153 during the checkout to identifying item details and item pricing necessary to complete the checkout of a customer at a terminal 150 (SST or POS terminal).

However, sometimes the confidence level for each of the potential item codes for a given set of image patches is below a threshold and/or the MLM 117 returns different item codes for each of the patches in the set with only marginally acceptable confidence. In these situations, manager 113 modifies the original RGB images by highlighting or circling the image patches associated with an unknown item in each RGB image and sends back to the transaction manager 143 and/or 153. A user-facing interface of transaction manager 143 and/or 153 then presents the modified RGB images for scrolling and viewing by the operator and asks the operator to identify the unknown item from the current items of the checkout, place the item over the integrated scanner of terminal 150 or uses a handheld scanner of terminal 150 and scan the item barcode of the unknown item. Additionally, the item codes for the other items may be presented through the user-facing interface to the operator so the operator can by the process of elimination identify which of the items was associated with the highlighted item patches in the RGB images.

When the operator scans the unknown item using the integrated or handheld scanner of terminal 150, cameras 120 and 130 capture additional images of the unknown item that is now mostly separated within the transaction area from the other items and is known to be in front of the scanner. Training data manager 116 receives the item code resolved by scanning the unknown item's barcode by the operator from transaction manager 143 and/or 153. Training data manager 116 then labels the original image patches in the original RGB images with the item code and labels the new images captured during the scanning of the unknown item code with the item code. This labeled data is then set aside in a training data store for use during a subsequent training session of MLM 117. This also ensures that the accuracy of MLM 117 is incrementally being improved as more real-world data (images) are collected for items during subsequent training sessions with the real-world data (images that are labeled with the item code).

When the item code for the unknown item is not in an item catalogue for a given retailer, new item manager raises a flag for the item code to cause a workflow associated with the item catalogue to add the new item code to the item catalogue of the retailer.

Additionally, when the new images of the unknown item are obtained during the scanning of the item barcode for the unknown item. The new images are scored by scan item check manager 115 by extracting image features (edges, color, texture, size, dimensions, shape) and weighting the features to obtain a score. The image patches known to be associated with the item from the original RGB images are similarly scored by scan item check manager 115. The score of the new images is compared to the score of the image patches by the scan item check manager 115 and when the two scores are not within a predefined threshold range indicating a satisfactory degree of similarity, scan item check manager 115 sends an alert or raises a flag to transaction manager 143 and/or 153. This causes a workflow to be processed that interrupts the checkout and calls for an attendant to verify the scanned item is what the customer is taking when the checkout is completed. This ensures that a customer or a cashier who knows the customer is not scanning a less expensive item, but the customer is leaving with the unknown item that was incorrectly identified as the less expensive item (because the customer scanned the less expensive item). When this occurs, the labeled image patches and the labeled new images are backed out of the training data store by training data manager 116, since this is incorrect item information that will adversely impact subsequent training sessions with MLM 117.

In an embodiment, an attendant can utilize an option of transaction manager 143 and/or 153 to update the item product catalogue and update training images for a new item. When the option is selected by the attendant at a terminal 150, the attendant places each new item down in the scan zone and scans the item barcode, the new item manager 114 adds the item code to the produce catalogue, and training data manager adds the item code to a list of items that the MLM 117 is trained on, labels the images of the new items with the scan item codes, and stores the labeled images in the training data store for a training session with MLM 117.

In an embodiment, the transaction terminal 150 is an SST or a POS terminal.

These embodiments and other embodiments are now discussed with reference to the FIGS. 2-3.

Figure 2:
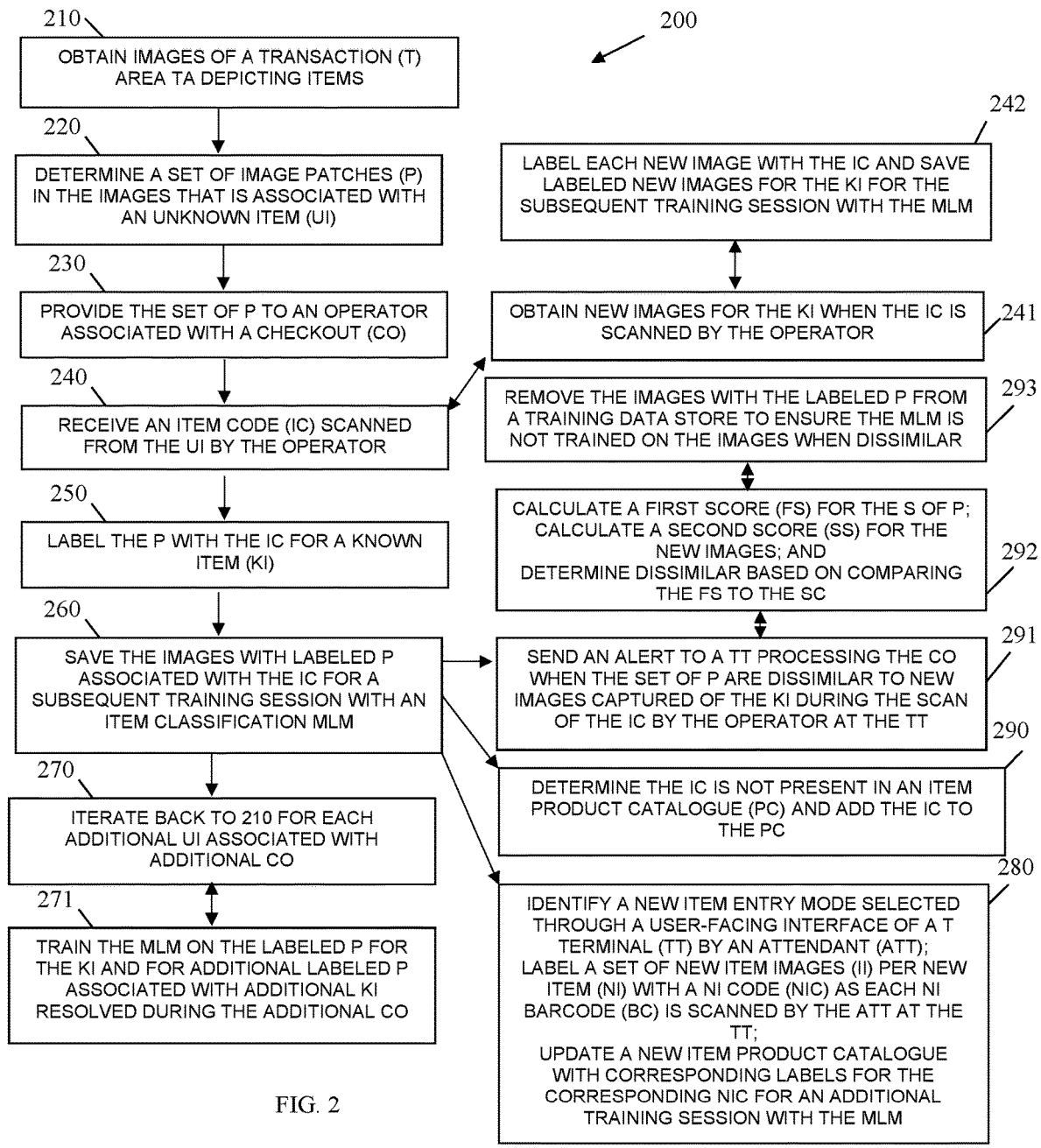
FIG. 2 is a diagram of a method for an incremental training of a MLM for multiview item recognition, according to an example embodiment.

FIG. 2 is a diagram of a method 200 for an incremental training of a MLM for multiview item recognition, according to an example embodiment. The software module(s) that implements the method 200 is referred to as a "crowd-sourced MLM trainer." The crowd-sourced MLM trainer is implemented as executable instructions programmed and residing within memory and/or a non-transitory computer-readable (processor-readable) storage medium and executed by one or more processors of a device. The processor(s) of the device that executes the crowd-sourced MLM trainer are specifically configured and programmed to process the crowd-sourced MLM trainer. The crowd-sourced MLM trainer has access to one or more network connections during its processing. The network connections can be wired, wireless, or a combination of wired and wireless.

In an embodiment, the crowd-sourced MLM trainer executes on cloud 110. In an embodiment, the crowd-sourced MLM trainer executes on server 110.

In an embodiment, the crowd-sourced MLM trainer is all or some combination of 113, 114, 115, 116, and 117.

At 210, the crowd-sourced MLM trainer obtains images of a transaction area depicting items.

At 220, the crowd-sourced MLM trainer determines a set of image patches (RGB pixel data) in the images that is associated with an unknown item (or an unrecognized item based on processing MLM 117).

At 230, the crowd-sourced MLM trainer provides the set of image patches to an operator associated with a checkout at a transaction terminal 150.

At 240, the crowd-sourced MLM trainer receives an item code scanned from the unknown item by the operator.

In an embodiment, at 241, the crowd-sourced MLM trainer obtains new images for the known item when the item code is scanned by the operator at the transaction terminal 150.

In an embodiment of 241 and at 242, the crowd-sourced MLM trainer labels each new image with the item code and saves labeled new images for the known item for subsequent training sessions an item classification MLM 117.

At 250, the crowd-sourced MLM trainer labels the image patches of the set within the images with the item code for a now known item.

At 260, the crowd-sourced MLM trainer saves the images with the labeled portions associated with the item code for the subsequent training session with the item classification MLM 117.

In an embodiment, at 270, the crowd-sourced MLM trainer iterates back to 210 for each additional unknown item associated with or detecting during additional checkouts at the transaction terminal 150.

In an embodiment of 270 and at 271, the crowd-sourced MLM trainer trains the item classification MLM 117 on the labeled portions for the known item and for additional labeled portions associated with additional known items resolved during the additional checkouts at the transaction terminal 150.

In an embodiment, at 280, the crowd-sourced MLM trainer identifies a new item entry mode selected through a user-facing interface of the transaction terminal 150 by an attendant. The crowd-sourced MLM trainer labels a set of new images per new item with a new item code as each new item barcode is scanned by the attendant at the transaction terminal 150. The crowd-sourced MLM trainer updates a new item product catalogue with corresponding labels for the corresponding new item codes for an additional training session with the item classification MLM 117.

In an embodiment, at 290, the crowd-sourced MLM trainer determines the item code is not present in an item product catalogue and the crowd-sourced MLM trainer adds the item code to the item product catalogue.

In an embodiment, at 291, the crowd-sourced MLM trainer sends an alert to the transaction terminal 150 that is processing the checkout when the set of image patches are dissimilar to new images captured of the known item during the scan of the item barcode by the operator at the transaction terminal 150.

In an embodiment of 291 and at 292, the crowd-sourced MLM trainer calculates a first score from the set of image patches, calculates a second score from the new images, and determines whether or not there is dissimilarity based on comparing the first score to the second score.

In an embodiment of 292 and at 293, the crowd-sourced MLM trainer removes the images with the labeled portions from a training data store to ensure the item classification MLM 117 is not trained on the images or new images when dissimilarity is determined to be present between the new images and the set of image patches.

Figure 3:
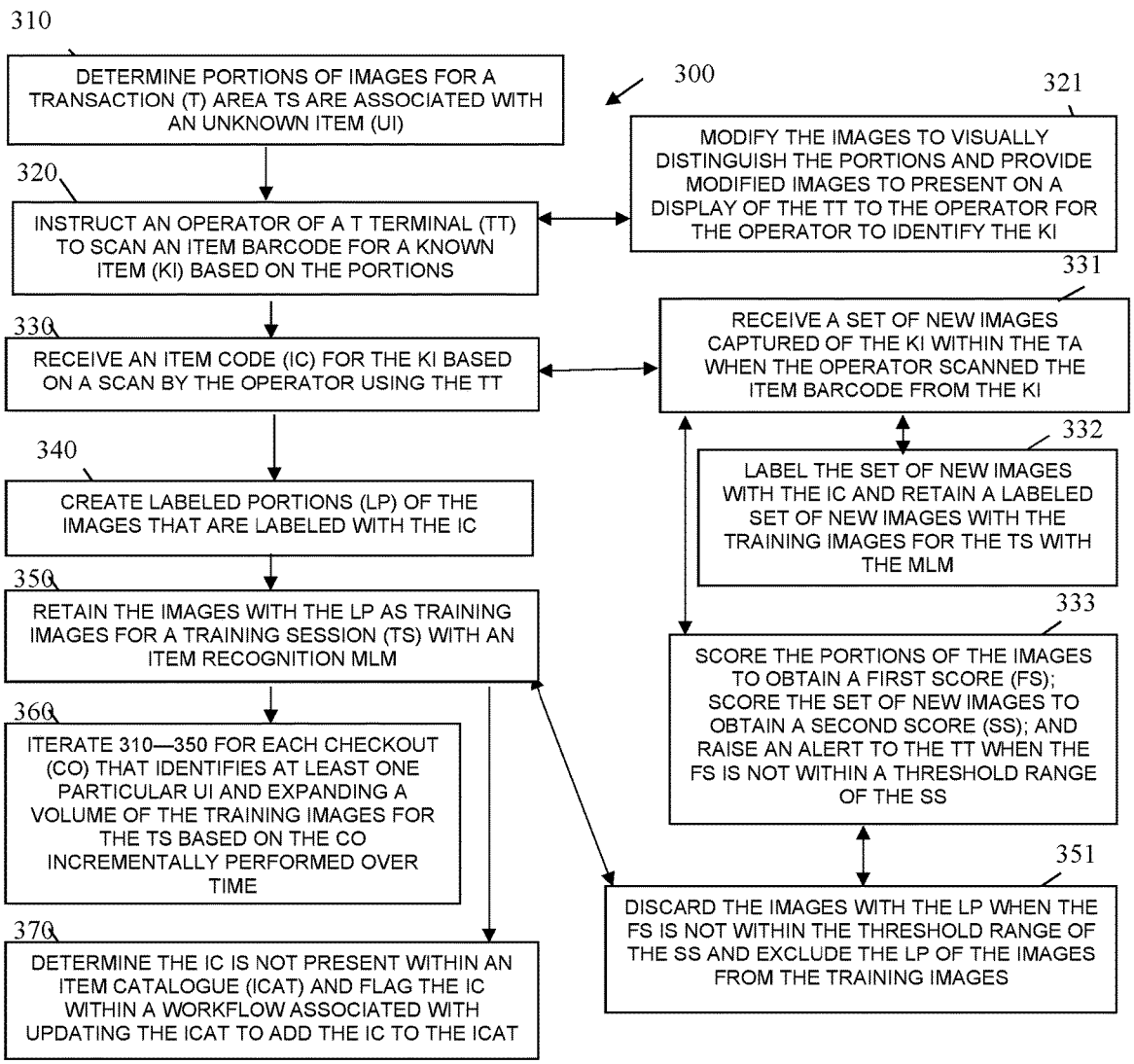
FIG. 3 is a diagram of another method for an incremental training of a MLM for multiview item recognition, according to an example embodiment.

FIG. 3 is a diagram of another method 300 for incremental training of a MLM for multiview item recognition, according to an example embodiment. The software module(s) that implements the method 200 is referred to as an "incremental MLM trainer." The incremental MLM trainer is implemented as executable instructions programmed and residing within memory and/or a non-transitory computer-readable (processor-readable) storage medium and executed by one or more processors of a device. The processor(s) of the device that executes the incremental MLM trainer are specifically configured and programmed to process the incremental MLM trainer. The incremental MLM trainer has access to one or more network connections during its processing. The network connections can be wired, wireless, or a combination of wired and wireless.

In an embodiment, the device that executes the incremental MLM trainer is cloud 110. In an embodiment, the device that executes the incremental MLM trainer is server 110.

In an embodiment, the incremental MLM trainer is all or some combination of 113, 114, 115, 116, 117, and/or method 200.

In an embodiment, the incremental MLM trainer shows another and, in some ways, an enhanced processing perspective from that what was shown above with system 100 and method 200.

At 310, the incremental MLM trainer determines portions of images for a transaction area are associated with an unknown or unrecognized item.

At 320, the incremental MLM trainer instructs an operator of a transaction terminal 150 to scan an item barcode for a known item based on the portions.

In an embodiment, at 321, the incremental MLM trainer modifies the images to visually distinguish the portions within the images and provides modified images to present on a display of the transaction terminal 150 to the operator for the operator to identify the known item.

At 330, the incremental MLM trainer receives an item code for the known item based on a scan by the operator of the item barcode using the transaction terminal (integrated scanner or handheld portable scanner).

In an embodiment, at 331, the incremental MLM trainer receives a set of new images captured of the known item within the transaction area when the operator scanned the item barcode from the known item.

In an embodiment of 331 and at 332, the incremental MLM trainer labels the set of new images with the item code and retains a labeled set of new images with training images for a training session with an item recognition MLM 117.

In an embodiment of 331 and at 333, the incremental MLM trainer scores the portions of the images to obtain a first score, scores the set of new images to obtain a second score, and raises an alert to the transaction terminal when the first score is not within a threshold range of the second score.

At 340, the incremental MLM trainer creates labeled portions of the images that are labeled with the item code.

At 350, the incremental MLM trainer retains the images with the labeled portions as the training images for a training session with the item recognition MLM 117.

In an embodiment of 333 and 350, at 351, the incremental MLM trainer discards the images with the labeled portions when the first score is not within the threshold range of the second score and excludes the labeled portions of the images from the training images.

In an embodiment, at 360, the incremental MLM trainer iterates back to 310 for each checkout that identifies at least one particular unknown item and expands a volume of the training images for the training session based on the checkouts incrementally performed over time.

In an embodiment, at 370, the incremental MLM trainer determines the item code is not present within an item catalogue and flags the item code within a workflow associated with updating the item catalogue to add the item code to the item catalogue during a next scheduled update of the item catalogue.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining images of a transaction area depicting items;
    determining a set of image patches in the images that is associated with an unknown item;
    providing the set of image patches to an operator associated with a checkout;
    receiving an item code scanned from the unknown item by the operator;
    labeling the set of image patches with the item code for a known item;
    saving the images with labeled image patches associated with the item code for a subsequent training session with an item classification Machine-Learning Model (MLM); and
    sending an alert to a transaction terminal processing the checkout when the set of image patches are dissimilar to new images captured of the known item during a scan of the item code by the operator at the transaction terminal.

2. The method of claim 1 further comprising, iterating back to the obtaining for each additional unknown item associated with additional checkouts.

3. The method of claim 2 further comprising, training the item classification MLM on the set of image patches labeled for the known item and for additional labeled image patches associated with additional known items resolved during the additional checkouts.

4. The method of claim 1 further comprising:
    identifying a new item entry mode selected through a user-facing interface of a transaction terminal by an attendant;
    labeling a set new item images per new item with a new item code as each new item barcode is scanned by the attendant at the transaction terminal;
    updating an item product catalogue with corresponding new item codes; and saving the set of new item images with corresponding labels for the corresponding new item codes for an additional training session with the item classification MLM.

5. The method of claim 1 further comprising, determining the item code is not present in an item product catalogue and adding the item code to the item product catalogue.

6. The method of claim 1 further comprising, sending an alert to a transaction terminal processing the checkout when the set of image patches are dissimilar to new images captured of the known item during the scan of the item code by the operator at the transaction terminal.

7. The method of claim 6, wherein sending further includes calculating a first score for the set of image patches from first image features, calculating a second score for the new images, and determining that the set of image patches is dissimilar to the new images for the known item based on comparing the first score and the second score.

8. The method of claim 7 further comprising:
removing the set of image patches with corresponding labels associated with the item code from a training data store to ensure the item classification MLM is not trained with the images based on the determining that the set of image patches is dissimilar to the new images.

9. The method of claim 1, wherein receiving further includes obtaining new images for the known item when the item code is scanned by the operator.

10. The method of claim 9, wherein obtaining the new images further includes labeling each new image with the item code and saving labeled new images for the known item for the subsequent training session with the item classification MLM.

11. A method, comprising:
determining that portions of images for a transaction area are associated with an unknown item;
instructing an operator of a transaction terminal to scan an item barcode for a known item based on the portions;
receiving an item code for a known item based on a scan by the operator using the transaction terminal;
creating labeled portions for the portions of the images that is labeled with the item code;
retaining the images with the labeled portions as training images for a training session with an item recognition Machine-Learning Model (MLM); and
modifying the images to visually distinguish the portions and providing modified images to present on a display of the transaction terminal to the operator for the operator to identify the known item from other items.

12. The method of claim 11 further comprising, iterating the method for each checkout that identifies at least one particular unknown item and expanding a volume of the training images for the training session based on a plurality of checkouts incrementally performed over time.

13. The method of claim 11 further comprising, determining the item code is not present in an item catalogue and flagging the item code within a workflow associated with updating the item catalogue to add the item code to the item catalogue.

14. The method of claim 13, wherein receiving further includes receiving a set of new images captured of the known item within the transaction area when the operator scanned the item barcode from the known item.

15. The method of claim 14, wherein receiving the set of the new images further includes labeling the set of new images with the item code and retaining a labeled set of new images with the training images for the training session with the item recognition MLM.

16. The method of claim 14, wherein receiving further the set of new images further includes scoring the portions of the images to obtain a first score, scoring the set of new images to obtain a second score, and raising an alert to the transaction terminal when the first score is not within a threshold range of the second score.

17. The method of claim 16, wherein retaining further includes discarding the images with the labeled portions when the first score is not within the threshold range of the second score and excluding the labeled portions of the images from the training images.

18. The method of claim 11, wherein instructing further includes modifying the images to visually distinguish the portions and providing modified images to present on a display of the transaction terminal to the operator for the operator to identify the known item from other items.

19. A system, comprising:
a server comprising at least one processor and a non-transitory computer-readable storage medium;
the non-transitory computer-readable storage medium comprises executable instructions; and
the executable instructions when executed by the at least one processor from the non-transitory computer-readable storage medium cause the at least one processor to perform operations comprising:
identifying portions of images captured of a transaction area for a transaction terminal during a checkout at the transaction terminal by an operator, wherein each image depicts multiple items within the transaction area from a different camera situated at a unique location within the transaction area and having a different perspective angle of the transaction area from remaining cameras associated with multiple images;
determining that a set of the portions that span the images is associated with an unknown item;
presenting the set of the portions on a display of the transaction terminal to the operator for the operator to identify a known item associated with the set of the portions from the multiple items;
instructing the operator to a scan of an item barcode for the known item identified by the operator at the transaction terminal;
receiving an item code associated with the known item after the scan;
receiving multiple additional images captured of the known item within the transaction area during the scan;
labeling the set of the portions within the images and the multiple additional images with the item code for the known item; and
saving the images with each portion of the set labeled with the item code along with the multiple additional images labeled with the item code as training images; and
training an item recognition Machine-Learning Model (MLM) on the training images during a training session.

20. The system of claim 19, wherein the transaction terminal is a Point-Of-Sale (POS) terminal operated by the operator who is a cashier performing a cashier-assisted checkout at the transaction terminal or wherein the transaction terminal is a Self-Service Terminal operated by the operator who is a customer performing a self-checkout at the transaction terminal.

* * * * *